Patented Jan. 29, 1935

1,989,246

UNITED STATES PATENT OFFICE 1,989,246

PLASTIC COMPOSITION AND PROCESS OF MAKING THE SAME

Marion C. Reed, Charleston, W. Va., assignor to Carbide and Carbon Chemicals Corporation, a corporation of New York No Drawing. Application March 17, 1931, Serial No. 523,380

8 Claims. (Cl. 106—23)

This invention pertains to plastic compositions and particularly to plastic compositions comprising a polymerization product of a vinyl ester or esters and rubber.

It is well known that many products of importance and value may be obtained by the polymerization of vinyl esters. I have found that a wide variety of useful products having novel and entirely unforeseen properties may be obtained by adding rubber to these polymerization products. The term rubber as used in this specification and the appended claims is not restricted to a particular type of natural caoutchouc but is intended to include all naturally occurring rubber-like hydrocarbons, such as caoutchouc, deresinated gutta percha, deresinated balata, deresinated guayule rubber and conversion or isomerization products of these materials, such as reclaimed rubber, the thermoprenes as described by Fisher, Ind. Eng. Chem., 19, 1325 and, also, synthetic rubbers comprising polymerized diolefines. It is understood that in this connection vinyl esters means esters of both organic and inorganic acids, and that in referring to polymerization products of vinyl esters in the plural, I mean those resins produced by conjoint polymerization, viz. polymerization of two or more esters while in mutual contact. Examples of the latter products are resins made by conjointly polymerizing vinyl halides and vinyl esters of lower fatty acids as illustrated by vinyl chloride and vinyl acetate.

I may form new compositions embodying my invention by combining a polymerization product of a vinyl ester or esters, hereinafter referred to, in the specification and claims, as vinyl resin, with rubber in any proportions. The choice of proportions is governed by the type of product desired.

Vinyl resins have many adaptations as molding plastics, and as such it is generally necessary to work the resin on a differential speed roll mill during the compounding of the necessary filler, plasticizers and other materials with the resin. In many cases vinyl resins are difficult to work on the rolls, being somewhat sticky and at times even tending to decompose at the rolling temperature. I have found that the addition of 1% to 10% of rubber to the resin greatly facilitates working and manipulating the material. The rubber-containing mixture does not stick to the rolls, the power consumption of the mill is reduced, the generation of heat due to mechanical working is diminished and the decomposing effect of the heat is lessened. Thus, it becomes possible to compound the plastic composition at much lower temperatures and with less deleterious effect on the resin. A further advantage is found in the fact that the rubber, by smoothing out the milling operation, makes it possible more completely to free the plastic from air bubbles which are objectionable in molding operations.

Molded articles made from a plastic comprising a vinyl resin to which has been added a small amount of rubber are easily removed from the mold. The rubber apparently acts as a mold lubricant. As much as 10% by weight of rubber may be used to good advantage, but amounts in excess of this quantity of rubber, for instance 20% by weight or more, in some cases may produce weak, sticky and opaque products.

The foregoing discussion is confined to mixtures of vinyl resin and rubber in which the rubber is not vulcanized. It is also within the contemplation of the invention to include compositions in which vulcanizing ingredients and other materials are incorporated in the mix and the rubber is vulcanized. In this manner the variety of products obtainable is greatly enlarged.

In general, compositions composed mainly of vinyl resin with a small amount of rubber, very closely resemble the pure vinyl resin in properties, but are easier to process, tougher and more stable toward decomposition by heat. Compositions comprising relatively small amounts of vinyl resin in rubber yield elastic products resembling ordinary rubber, but slightly stiffer and more resistant to certain solvents. Compositions which comprise approximately equal proportions of rubber and vinyl resins, when vulcanized, yield tough, leathery products.

The following examples are illustrative of the invention:

I. A quantity of masticated pale crepe rubber was gradually added to an equal weight of a vinyl chloride polymer while the latter was being masticated on a differential speed roll mill, the rolls of which were maintained at a temperature of approximately 110° C. After the rubber was incorporated the mixture was stripped off the rolls as a sheet. This material is stiff and plastic and is an excellent base for chewing gum. If reinforcing and vulcanizing ingredients are added and the material is vulcanized it forms a tough, leathery substance which makes a very good leather substitute, for example as a shoe-soling material.

II. A material, serving as another example, was composed of the following in parts by weight:

| | |
|---|---|
| Vinyl acetate polymer | 10 |
| Pale crepe rubber | 100 |
| Sulfur | 4 |
| Litharge | 10 |
| Mercaptobenzothiazol | 1 |
| Stearic acid | 2 |

A portion of the rubber was placed on a roll and masticated until it ran smooth. The balance of the rubber and the vinyl resin were then added as a smooth previously milled batch of equal parts of rubber and vinyl resin. The remaining ingredients were then added in the usual way and the material was sheeted out and vulcanized. The vulcanized material resembled rubber, but was stiffer than similar sheets made without the vinyl resin, and had, as compared with rubber, marked resistance to gasoline.

III. Still another example is a material made up of 100 parts by weight of vinyl resin and 2 parts by weight of pale crepe rubber. The vinyl resin used was prepared by conjointly polymerizing 80 parts by weight of vinyl chloride and 20 parts by weight of vinyl acetate in the presence of 1 part by weight of benzoyl peroxide and 100 parts by weight of acetone. The rubber was incorporated with the dry vinyl resin by mixing on a differential roll mill at approximately 105° C. A clear amber colored plastic was obtained which possessed excellent mechanical and molding qualities. Similar plastics made without the addition of the rubber frequently may be more difficult to handle, and may only be removed from the mold with difficulty. In nearly all cases the addition of 1% to 10% of rubber to vinyl resins resulted in a tougher molding plastic.

IV. This example illustrates the adaptation of my invention to the formation of another type of material. The vinyl resin used in this material was prepared as described in Example III.

| | Parts by weight |
|---|---|
| Vinyl resin | 33 |
| Pale crepe rubber | 100 |
| Sulfur | 45 |
| Calcium stearate | 2 |
| Hydrated lime | 10 |

These materials were mixed on a roll mill and vulcanized by heating in a press for two hours at 160° C. The resulting product was similar to but harder than ebonite.

V. The foregoing examples have shown the processes of compounding the materials of the invention by mixing the ingredients on roll mills. It is possible to utilize other methods of obtaining my new material. An illustration of an alternative mode of procedure is as follows: Three parts of a vinyl resin prepared by the method described in Example III was mixed with 1 part of deresinated balata and 45 parts of chlorbenzene. This mixture was agitated with slight heating until the rubber and vinyl resin were dissolved. The solute was then precipitated by pouring the solution into cold petroleum ether, the precipitate was washed with cold petroleum ether and dried. This material was then sheeted out on a roll mill as a tough material resembling parchment.

Various other methods of mixing the vinyl resins and rubber may be adopted, for example, mixing on a roll mill or precipitation from a common solvent as described, and in addition the material may be produced by dissolving the ingredients in a common solvent followed by evaporating of the solvent, or, by mixing aqueous dispersions of the materials.

The foregoing examples are merely for the purpose of illustration. Numerous modifications of my invention are possible and will be apparent.

I claim:

1. A homogeneous and amorphous composition comprising rubber together with a vinyl resin identical with a resin resulting from the conjoint polymerization of two different vinyl esters.

2. A homogeneous and amorphous composition comprising rubber together with a vinyl resin identical with a resin resulting from the conjoint polymerization of a vinyl halide and a vinyl ester of a lower fatty acid.

3. A homogeneous and amorphous composition comprising rubber together with a vinyl resin identical with a resin resulting from the conjoint polymerization of vinyl chloride and vinyl acetate.

4. A homogeneous and amorphous composition comprising rubber together with a vinyl resin identical with a resin resulting from the conjoint polymerization of vinyl chloride and vinyl acetate in the proportions of about 80% by weight of the chloride.

5. Method of making a plastic composition which includes the step of intimately combining into a substantially homogeneous mass rubber and a vinyl resin identical with a resin selected from the group consisting of polymerized vinyl esters and conjointly polymerized vinyl esters, said step comprising mastication of the materials at temperatures of from about 100° C. to about 115° C.

6. Method of making a plastic composition which includes the step of intimately combining into a substantially homogeneous mass rubber and a vinyl resin identical with a resin resulting from the conjoint polymerization of a vinyl halide and a vinyl ester of an aliphatic acid.

7. Method of making a plastic composition which includes the step of intimately combining into a substantially homogeneous mass rubber and a vinyl resin identical with a resin resulting from the conjoint polymerization of a vinyl halide and a vinyl ester of an aliphatic acid, said step comprising mastication of the materials on a roll mill.

8. A tough, stable and resistant homogeneous and amorphous material comprising a vulcanized composition containing rubber, vulcanizing materials, and a vinyl resin identical with a resin resulting from the conjoint polymerization of vinyl chloride and a vinyl ester of a lower fatty acid.

MARION C. REED.

CERTIFICATE OF CORRECTION.

Patent No. 1,989,246. January 29, 1935.

MARION C. REED.

It is hereby certified that error appears in the printed specification of the above numbered patent requiring correction as follows: Page 1, first column, line 21, beginning with the words "It is understood" strike out all to and including the word "acetate" in line 31, and insert the same after line 38, in the same column; and that the said Letters Patent should be read with this correction therein that the same may conform to the record of the case in the Patent Office.

Signed and sealed this 19th day of March, A. D. 1935.

Leslie Frazer (Seal)

Acting Commissioner of Patents.